United States Patent [19]
Miyasaka

[11] Patent Number: 6,132,902
[45] Date of Patent: Oct. 17, 2000

[54] ELECTRIC AUTOMOBILE AND ELECTRIC POWER DRIVE THEREFOR

[75] Inventor: Tsutomu Miyasaka, Kanagawa, Japan

[73] Assignee: Fuji Photo Film Co., Ltd., Kanagawa, Japan

[21] Appl. No.: 08/876,205

[22] Filed: Jun. 16, 1997

[30] Foreign Application Priority Data

Jun. 14, 1996 [JP] Japan .................................. 8-175911
Jun. 14, 1996 [JP] Japan .................................. 8-175912

[51] Int. Cl.$^7$ ...................................................... H01M 4/48
[52] U.S. Cl. ........................... 429/224; 429/120; 429/304; 180/65.3
[58] Field of Search .................................. 429/224, 304, 429/306, 120; 180/65.1, 65.3

[56] References Cited

U.S. PATENT DOCUMENTS

| | | |
|---|---|---|
| 5,291,960 | 3/1994 | Brandenburg et al. . |
| 5,561,007 | 10/1996 | Saidi . |
| 5,631,104 | 5/1997 | Zhong et al. ........................ 429/224 X |
| 5,760,488 | 6/1998 | Sonntag .............................. 180/65.1 X |

Primary Examiner—John S. Maples
Attorney, Agent, or Firm—Sughrue, Mion, Zinn, Macpeak & Seas, PLLC

[57] ABSTRACT

An electric automobile which is equipped with an electric power drive composed of a main electric power drive source of a lithium ion secondary battery which contains a positive electrode active material of lithium manganese oxide having spinel structure and/or a negative electrode active material of a complex metal oxide which accepts intercalation of a lithium ion, an auxiliary electric power source, a temperature-controlling means, and a regenerative braking device, shows a good balance in the relationship between driving performance and safety and cost.

9 Claims, 1 Drawing Sheet

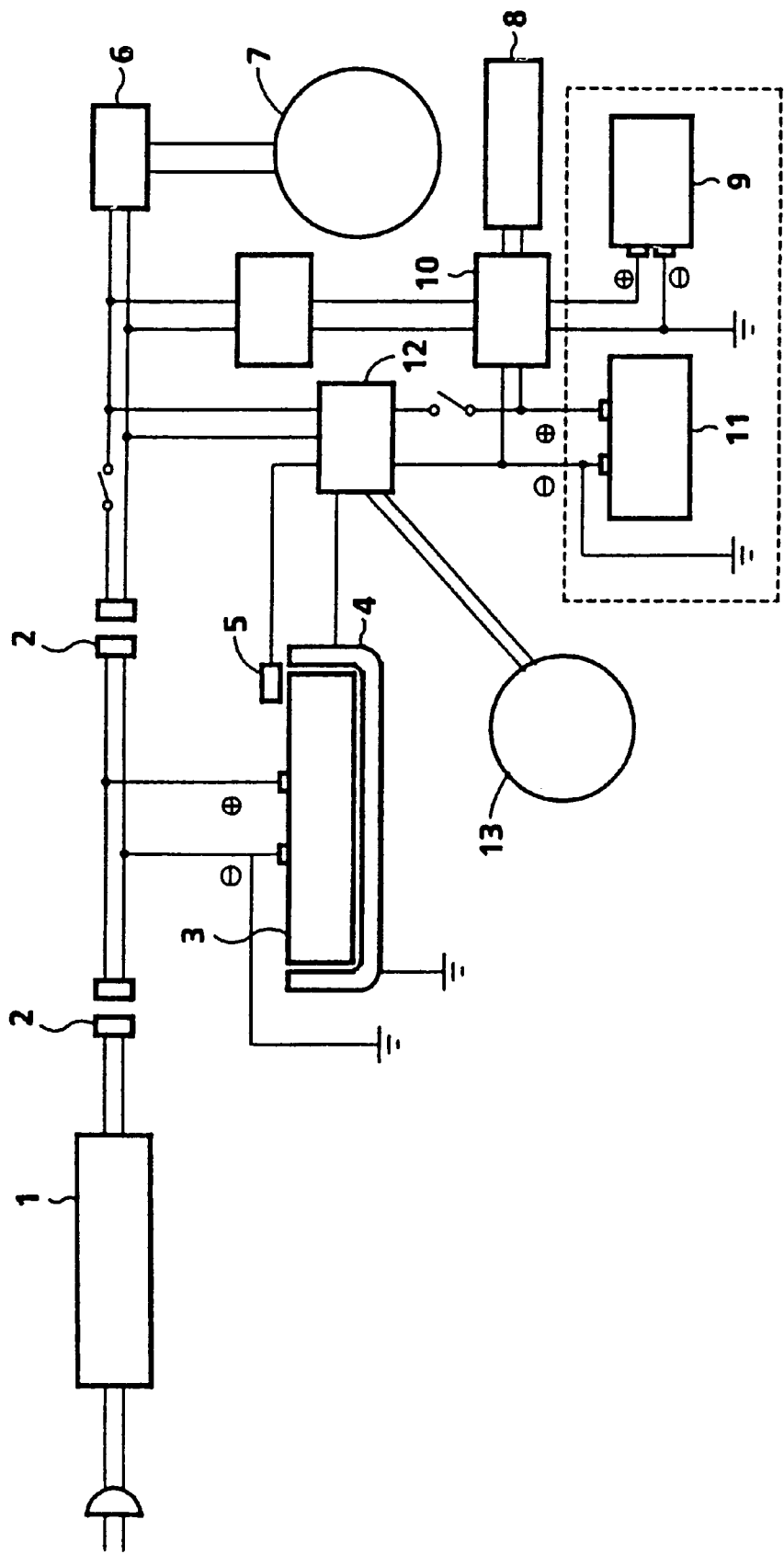
FIGURE

ELECTRIC AUTOMOBILE AND ELECTRIC POWER DRIVE THEREFOR

FIELD OF THE INVENTION

This invention relates to an electric automobile and an electric power drive favorably employable for the electric automobile.

BACKGROUND OF THE INVENTION

It is known that the use of an electric automobile is advantageous as compared with an automobile using an internal combustion engine, from the viewpoints of energy saving and air pollution. The electric automobile, however, is required to be more improved, particularly, in its driving distance at one charging operation, driving performance such as acceleration performance, and safety in the driving operation. The improvement can be, in part, attained by the improvement of a motor for driving the automobile. It is considered, however, that the improvement can be attained more efficiently by improving an electric battery to be mounted onto the automobile.

The driving distance at one charging operation can be prolonged by mounting a battery having a large electric capacity onto an automobile. Generally, a battery having a large electric capacity is large in its volume and heavy in its weight.

In order to solve the above-mentioned problems, a lithium ion secondary battery is paid an attention. It is known that a lithium ion secondary battery utilizing a lithium cobalt oxide as a positive electrode material and a carbonaceous material (e.g., graphite) as a negative electrode material can give a high voltage in the range of 3 to 4 V and a high energy density in the range of 200 to 300 Wh/L. The energy density of the lithium ion secondary battery is two to three times as much as that of a generally employed lead-acid battery (approximately 100 Wh/L) and 1.5 times as much as that of the nickel-hydrogen secondary battery (160 to 200 Wh/L). Therefore, if the lithium ion secondary battery is employed, the volume and weight of the battery can be greatly reduced. However, it is also important that the lithium ion secondary battery should be operated at the optimum temperature condition to keep the efficiency of charging and discharging operations. Japanese Patent Provisional Publications No. H7-1973 and No. H8-22845 describe a temperature-controlling means for a battery mounted in an automobile which utilizes a circulating water.

SUMMARY OF THE INVENTION

It is an object of the present invention to provide an electric automobile which is equipped with an improved electric power driving system.

It is another object of the invention to provide an electric automobile which shows a prolonged driving distance at one charging operation.

It is a further object of the invention to provide an electric automobile which shows a prolonged driving distance at one charging operation and further shows an improved driving performance and safety.

It is a further object of the invention to provide an electric power drive system favorably employable for an electric automotive.

The invention resides in an electric automobile which is equipped with (1) a main electric power drive source comprising a lithium ion secondary battery which contains a positive electrode active material comprising lithium manganese oxide of spinel crystal structure, (2) an auxiliary electric power source, (3) a temperature-controlling means, and (4) a regenerative braking means. The lithium ion secondary battery is generally used in the main electric power drive source in the layer built (or multilayered or piled) form.

The invention also resides in an electric power drive means which comprises a main electric power drive source comprising a lithium ion secondary battery which contains a positive electrode active material comprising lithium manganese oxide of spinel crystal structure, an auxiliary electric power source, a temperature-controlling means, and a regenerative braking means.

The invention further resides in an electric automobile which is equipped with a main electric power drive source comprising a lithium ion secondary battery which contains a negative electrode active material comprising an oxide of a combination of two or more metal elements which accepts intercalation of a lithium ion, an auxiliary electric power source, a temperature-controlling means, and a regenerative braking means.

The invention furthermore resides in an electric power drive means which comprises a main electric power drive source comprising a lithium ion secondary battery which contains a negative electrode active material comprising an oxide of a combination of two or more metal elements which accepts intercalation of a lithium ion, an auxiliary electric power source, a temperature-controlling means, and a regenerative braking means.

BRIEF DESCRIPTION OF THE DRAWINGS

FIGURE illustrates a system of an electric automobile and an electric power drive means according to the invention.

PREFERRED EMBODIMENTS OF THE INVENTION

The preferred embodiments of the present invention are described below.

1) The lithium manganese oxide is that of cubic crystal system having the following formula:

$$Li_yMn_2O_4$$

wherein y satisfies the condition of $0<y\leq1.2$.

2) The lithium manganese oxide of spinel crystal structure has the following formula:

$$Li_xMn_{2-a}M_{a/c}O_{4+b}$$

wherein M is cation of a metal other than Li and Mn; x, a, c and b are numbers satisfying the conditions of $0.1<x\leq1.2$, $0\leq a\leq2$, $1\leq c\leq3$, and $0\leq b<0.3$, respectively.

3) The negative electrode active material comprising a metal alloy or an oxide of a combination of tin (II) and one or more other elements which accepts intercalation of a lithium ion.

4) The lithium ion secondary battery contains a solid electrolyte comprising an ion conductive polymer or an ion conductive inorganic material.

5) The auxiliary electric power source is selected from the group consisting of a lead-acid battery, a nickel-hydrogen battery, a sodium cell, a fuel cell, and a solar battery.

6) The lithium ion secondary battery comprises a plurality of battery units connected in series which is encased in the temperature-controlling means.

The characteristic feature of the invention resides in the use of the specifically formulated lithium ion secondary battery (which serves as a main electric power source for driving), an auxiliary electric power source, a temperature-controlling means, and a regenerative braking means in combination.

The lithium manganese oxide of spinel crystal structure preferably employed as a positive electrode material of the lithium ion secondary battery has the following formula:

$$Li_xMn_{2-a}M_{a/c}O_{4+b}$$

wherein M is cation of a metal other than Li and Mn; x, a, c and b are numbers satisfying the conditions of $0.1 < x \leq 1.2$, $0 \leq a \leq 2$, $1 \leq c \leq 3$, and $0 \leq b < 0.3$, respectively.

"M" is a dope element for Mn and preferably is cation of a divalent to tetravalent transitional metal. Preferred examples of the transition metals include Co, Ni, Fe, Cr, Cu and Ti. The cation can be a cation of at least one of these elements. From the viewpoint of storage stability, atomic elements other than the transition metal, such as Zr, Nb and Y, are preferred. From the same viewpoint, lanthanide elements such as La, Sm and Eu are also preferably employed. For the improvement of charge-discharge cycle-life and storage stability, M can be a cation of an alkali metal or an alkaline earth metal such as Na, K, Ca, Mg, or Cs. Most preferred cations for "M" are divalent cations of Co, Fe, and Nb.

In the formula, "x" preferably satisfies the condition of $0.1 < x < 1.0$, more preferably $0.1 < x \leq 0.9$, so as to keep a high voltage range of 3.7 to 4.3 V against Li in the discharge process.

The oxide having spinel crystal structure generally has a formula of $A(B_2)O_4$, in which oxygen anions are arranged at the tops of tetragonal and hexagonal planes of the cubic close-packed structure. Based on the arrangements of the cation "A", the spinel structures are classified into a regular (or normal) spinel, that is, $A(B_2)O_4$, and a reverse spinel, that is, $A(A,B)O_4$. There is an intermediate spinel structure such as those of $A_x, B_y (A_{1-x}, B_{1-y})O_4$. A representative lithium manganese oxide of the regular spinel is $LiMn_2O_4$. In this structure, a half of Mn cations are trivalent and another half are tetravalent. $\lambda$-$MnO_2$, that is a known active material, has the crystal structure of $LiMn_2O_4$ from which lithium is removed, that is called a defective spinel structure, as is described in U.S. Pat. No. 4,246,253. In this crystal structure, all Mn cations are tetravalent. The lithium manganese-metal complex oxide employed in the invention can have any spinel structures, such as regular spinel, reverse spinel, intermediate spinel, and defective spinel including a spinel of non-stoichiometric composition.

Preferred examples of the lithium manganese oxide of spinel crystal structure are set forth in Table 1.

TABLE 1

| No. | Composition of Precursor | Variation of Composition of Active Material |
|---|---|---|
| 1 | $Li_{1.01}Mn_{2.0}O_4$ | $Li_{0.1-0.9}Mn_{2.0}O_4$ |
| 2 | $Li_{1.02}Mn_{1.9}Co_{0.03}O_4$ | $Li_{0.1-0.9}Mn_{1.9}Co_{0.03}O_4$ |
| 3 | $Li_{1.01}Mn_{1.9}Fe_{0.05}O_4$ | $Li_{0.1-0.9}Mn_{1.9}Fe_{0.05}O_4$ |
| 4 | $Li_{1.0}Mn_{1.9}Cr_{0.05}O_4$ | $Li_{0.1-0.9}Mn_{1.9}Cr_{0.05}O_4$ |
| 5 | $Li_{1.01}Mn_{1.9}Cu_{0.1}O_4$ | $Li_{0.2-0.9}Mn_{1.9}Cu_{0.1}O_4$ |
| 6 | $Li_{1.0}Mn_{1.85}Ni_{0.07}O_4$ | $Li_{0.2-0.9}Mn_{1.85}Ni_{0.07}O_4$ |
| 7 | $Li_{1.0}Mn_{1.95}Ti_{0.05}O_4$ | $Li_{0.2-0.9}Mn_{1.95}Ti_{0.05}O_4$ |
| 8 | $Li_{1.0}Mn_{1.95}Zr_{0.02}O_4$ | $Li_{0.2-0.9}Mn_{1.95}Zr_{0.02}O_4$ |
| 9 | $Li_{1.02}Mn_{1.95}Nb_{0.05}O_4$ | $Li_{0.2-0.9}Mn_{1.95}Nb_{0.05}O_4$ |
| 10 | $Li_{1.0}Mn_{1.95}Y_{0.02}O_4$ | $Li_{0.2-0.9}Mn_{1.95}Y_{0.02}O_4$ |
| 11 | $Li_{1.0}Mn_{1.95}Al_{0.02}O_4$ | $Li_{0.2-1.0}Mn_{1.95}Al_{0.02}O_4$ |
| 12 | $Li_{1.0}Mn_{1.97}K_{0.03}O_4$ | $Li_{0.2-1.0}Mn_{1.97}K_{0.03}O_4$ |

TABLE 1-continued

| No. | Composition of Precursor | Variation of Composition of Active Material |
|---|---|---|
| 13 | $Li_{1.0}Mn_{1.97}Ca_{0.03}O_4$ | $Li_{0.2-1.0}Mn_{1.97}Ca_{0.03}O_4$ |
| 14 | $Li_{1.0}Mn_{1.97}Cs_{0.03}O_4$ | $Li_{0.2-1.0}Mn_{1.97}Cs_{0.03}O_4$ |
| 15 | $Li_{1.0}Mn_{1.92}La_{0.04}O_4$ | $Li_{0.2-1.0}Mn_{1.92}La_{0.04}O_4$ |
| 16 | $Li_{1.0}Mn_{1.92}Ce_{0.08}O_4$ | $Li_{0.2-1.0}Mn_{1.92}Ce_{0.08}O_4$ |
| 17 | $Li_{1.0}Mn_{1.92}Sm_{0.04}O_4$ | $Li_{0.2-1.0}Mn_{1.92}Sm_{0.04}O_4$ |

The lithium manganese-metal complex oxide can be employed further in combination with a lithium-containing transition metal oxide which serves as sub-active material. An preferred example of the sub-active material is lithium cobalt oxide ($Li_xCoO_2$, $0.5 \leq x \leq 1$, which gives a high voltage and a high electric capacity). Also preferred is lithium cobalt-nickel oxide ($Li_xCo_yNi_zO_2$, $0.5 < x \leq 1$, $0 \leq y \leq 1$, $0 < z \leq 1$, provided that y+z is not 0). The sub-active material may be a solid solution made of cobalt, other transition metal elements, non-transition metal elements, an alkali metal, and/or lanthanides.

The sub-active material can be employed in combination with the lithium manganese-metal complex oxide in the weight ratio of 2/8 to 1/9 (former/latter), preferably 3/7 to 7/3.

The lithium manganese oxide of spinel crystal structure of the positive electrode active material is preferably employed in combination with a negative electrode active material of metal alloy from the viewpoint of a high lithium content per unit volume.

Most preferred are solid solutions of two or more metals which have been developed for keeping production of dendrite low, and amorphous metal alloys. Examples of the preferred metal alloys are as follows: Li—Al, Li—Al—Mn (U.S. Pat. No. 4,820,599), Li—Al—Mg (Japanese Patent Provisional Publication No. 57-98977), Li—Al—Sn (Japanese Patent Provisional Publication No. 63-6742), Li—Al—In and Li—Al—Cd (Japanese Patent Provisional Publication No. H1-144573), Li—Ag (Japanese Patent Provisional Publication No. H7-296811), a mixture of two or more metal alloy (Japanese Patent Publication No. 7-114124), and lithium alloy complexed with carbon (Japanese Patent Provisional Publication No. H7-307154). Examples of the amorphous lithium alloys are described in Japanese Patent Provisional Publication No. H7-296812, and J. J. Houser, Phys. Rev. B, 11(10), 3860 (1975). Most preferred are Mg-containing lithium metal alloys which are described in A. Anani, R. A. Huggins, J. Power Source, 38, 363 (1992).

The lithium metal alloy can be in the form of a lithium-containing metal alloy when the negative electrode active material is incorporated into a battery casing. Otherwise, the lithium metal alloy can be formed in the battery by electro-chemically inserting a lithium ion into a metal alloy.

Examples of the lithium metal alloys preferably employed as the negative electrode active material include Li—Al, Li—Al—Mg, Li—Bi, Li—Al—Ga, Li—Al—Mn, Li—Si, Si—B, Li—Sb, Li—Zn, Li—Ag, Li—In, Li—Pb, LI—Ge, Li—Sn, Li—Ca, Li—Zn—C, Li—Mg—C, Li—Pb—C, Li—Ge—C, Li—Sn—C, Li—Al—C, Li—Sn—B, Li—Sn—Ge, Li—Si—Sn, Li—Sn—Ti, Li—Al—Mo, Li—Al—W, and Li—Al—Cu.

The lithium manganese oxide of spinel crystal structure of the positive electrode active material is also preferably employed in combination with a negative electrode active material comprising an oxide of a combination of tin (II) and one or more other elements which accepts intercalation of a lithium ion, from the view-point of the electric capacity/volume ratio and safety.

Preferred are tin(II)-containing metal oxides having one of the following three formulas:

$$SnL_kO_z \tag{1}$$

In the formula, L represents at least one atom selected from the group consisting of Al, B, P, Si, elements of Groups 1 to 3 of Periodic Table (such as Li, Na, K, Rb, Cs, Be, Mg, Ca, Sr, Ba, Sc, Y, and lanthanides) and halogen atoms. k and z are numbers satisfying the conditions of $0.2 \leq k \leq 2$ and $1 \leq z \leq 6$, respectively.

Among the tin-containing metal oxides of the formula (1), a compound of $SnT_hR_iO_z$. (in which T is at least one atom selected from the group consisting of Al, B, P, element of Groups 1 to 3 of Periodic Table, and halogens, and h, i and z are numbers satisfying the conditions of $0.2 \leq h \leq 2$, $0.01 \leq i \leq 1$, $0.2 \leq h+i \leq 2$, and $1 \leq z \leq 6$, respectively) is particularly preferred.

$$Sn_dQ_{1-d}L_kO_z \tag{2}$$

In the formula, Q is a transition metal atom, L is at least one atom selected from the group consisting of Al, B, P, Si, elements of Groups 1 to 3 of Periodic Table (such as Li, Na, K, Rb, Cs, Be, Mg, Ca, Sr, Ba, Sc, Y, and lanthanides), and halogens, and d, k and z are numbers satisfying the conditions of $0.1 \leq d \leq 0.9$, $0.2 \leq k \leq 2$, and $1 \leq z \leq 6$, respectively.

$$SnT_nR_iO_z \tag{3}$$

In the formula, T is an atom selected from the group consisting of Al, B, and P, R is at least one atom selected from the group consisting of elements of Groups 1 to 3 of Periodic Table (such as Li, Na, K, Rb, Cs, Be, Mg, Ca, Sr, Ba, Sc, Y, and lanthanides), and halogens, and h, i, and z are numbers satisfying the conditions of $0.2 \leq h \leq 2$, $0.01 \leq i \leq 1$, $0.2 \leq h+i \leq 2$, and $1 \leq z \leq 6$, respectively.

The tin-containing metal oxide preferably is amorphous material when it is placed in the container of the final battery product. The term of "amorphous material" in the invention means a material which gives a broad scattered band having its main peak in the range of 20° to 40° (in terms of 2θ) in X-ray diffraction using Cu-K α rays.

Examples of the tin-containing metal oxides for the negative electrode active material precursor include the following compounds:

$SnSi_{0.5}Al_{0.1}B_{0.2}P_{0.2}O_{1.95}$, $SnB_{0.5}P_{0.5}O_3$, $SnCs_{0.1}B_{0.4}P_{0.4}O_{2.65}$,
$Sn_{1.0}Cs_{0.1}B_{0.5}P_{0.5}O_x$, $Sn_{1.1}Cs_{0.1}B_{0.5}P_{0.5}O_x$, $SnBa_{0.1}B_{0.4}P_{0.4}O_{2.7}$,
$SnK_{0.1}Cs_{0.1}B_{0.4}P_{0.4}O_{2.7}$, $SnBa_{0.1}Cs_{0.1}B_{0.4}P_{0.4}O_{2.75}$,
$SnMg_{0.1}Rb_{0.1}Al_{0.1}B_{0.3}P_{0.4}O_{2.75}$, $SnMg_{0.1}Cs_{0.1}B_{0.4}P_{0.4}F_{0.2}O_{3.3}$,
$SnMg_{0.1}Al_{0.2}B_{0.4}P_{0.4}F_{0.2}O_{2.9}$, $Sn_{0.5}Mn_{0.5}Mg_{0.1}B_{0.9}O_{2.45}$,
$Sn_{0.5}Mn_{0.5}Ca_{0.1}P_{0.9}O_{3.35}$, $Sn_{0.5}Ge_{0.5}Mg_{0.1}P_{0.9}O_{3.35}$,
$Sn_{0.5}Fe_{0.5}Ba_{0.1}P_{0.9}O_{3.35}$, $Sn_{0.5}Fe_{0.5}Al_{0.1}B_{0.9}O_{2.5}$,
$Sn_{0.8}Fe_{0.2}Ca_{0.1}P_{0.9}O_{3.35}$, $Sn_{0.3}Fe_{0.7}Ba_{0.1}P_{0.9}O_{3.35}$,
$Sn_{0.9}Mn_{0.1}Mg_{0.1}P_{0.9}O_{3.35}$, $Sn_{0.7}Pb_{0.3}Ca_{0.1}P_{0.9}O_{3.35}$,
$Sn_{1.1}Ge_{0.1}Ba_{0.5}P_{0.5}O_{3.20}$, $Sn_{1.0}Cs_{0.1}Al_{0.1}B_{0.5}P_{0.5}O_x$,
$Sn_{0.1}Ge_{0.05}Cs_{0.1}Al_{0.1}B_{0.5}P_{0.5}O_x$.

The negative electrode active material can be one of the above-listed compounds or one of these compound which is doped with lithium.

The negative electrode active material can be a carbonaceous material. Examples of the carbonaceous materials include graphite-type carbonaceous material (Japanese Patent Provisional Publications No. H4-115457, No. H5-335017, and No. H6-168723), polyacene-type carbonaceous material (Japanese Patent Publication No. H4-6072), carbon fiber prepared from mesophase pitch (Japanese Patent Provisional Publication No. H4-61747), graphite-type carbonaceous material (Japanese Patent Provisional Publication No. H4-79155), carbonaceous material utilizing in part an amorphous carbonaceous material (Japanese Patent Provisional Publications No. H4-368778, No. H6-20690, and No. H6-84516), cokes (Japanese Patent Provisional Publication No. H5-307956), mesocarbon microbeads (Japanese Patent Provisional Publication No. H5-325947), and metal oxides (Japanese Patent Provisional Publication No. H7-192723).

For the secondary battery to be mounted on an electric automobile, safety requirement is especially high. Therefore, a solid electrolyte is preferably employed as the ion-conductive material. The electrolyte is placed between the positive electrode and the negative electrode. The solid electrolyte may be an ion conductive organic material or an ion conductive inorganic material. The ion conductive organic material is preferred from the viewpoint of a high current discharging property. Examples of the main ingredients of the ion conductive organic materials include polyethylene oxide derivatives or polymers to which the polyethylene oxide derivative is attached (Japanese Patent Provisional Publication No. 63-135447), polypropylene oxide derivatives or polymers to which the polypropylene oxide derivative is attached, polymers having an ion releasing group (Japanese Patent Provisional Publications No. 62-254302, No. 62-254303, and No. 63-193954), mixtures of polymers having an ion releasing group and known aprotonic electrolyte solutions (U.S. Pat. Nos. 4,792,504 and 4,830,939, Japanese Patent Provisional Publications No. 62-22375, No. 62-22376, No. 63-22375, No. 63-22776, and No. H1-95117), phosphate ester polymers (Japanese Patent Provisional Publication No. 61-256573), and other ion-conductive polymer materials. Otherwise, polyacrylonitrile can be added to an electrolyte solution (Japanese Patent Provisional Publication No. 62-278774). The ion-conductive inorganic material can be used in combination with the ion-conductive organic material (Japanese Patent Provisional Publication No. 60-1768).

In the electric automobile, a regenerative braking means is employed in combination of the above-described specific lithium ion secondary battery, so as to enhance efficiency in the use of electric power supplied by the secondary battery. For instance, an electric power generator (e.g., A.C. generator) for converting the kinetic energy which is generated when braking operation is done into electric energy, is attached to the power transmission device, for recovering the kinetic energy in the form of an electric power. The recovered electric power is then charged into the lithium ion secondary battery.

Generally, a plurality of electric motors are installed for driving a four-wheel electric automobile, for instance, one for two wheels, or one for each wheel. The electric motor can be installed within the body frame or within the wheel which is arranged outside of the frame. In the latter case, each wheel is directly driven by each of the installed motors, and the regenerative driving means is attached to each wheel.

The temperature-controlling means is effectively employed to enhance the charge-discharge efficiency of the secondary battery and prolong the driving distance at one charging operation. Particularly, a nonaqueous secondary battery such as the lithium ion secondary battery is relatively poor in the electric current discharge characteristic, particularly at low temperatures, as compared with the lead-acid battery of the aqueous secondary battery. Further, since the lithium ion secondary battery keeps to provide an electric current at a high voltage, its cycle life is apt to shorten, particularly at high temperatures. For these reasons, the lithium ion secondary battery is preferably kept at an appropriate temperature (generally 20 to 45° C.) during the working of the battery.

The lithium ion secondary battery is preferably employed in the form of a battery module. A plurality of the battery modules are connected in series or in parallel to each other and combined to form a multi-layered or piled structure, which is named battery unit. Thus, the lithium ion secondary battery is generally mounted onto an electric automobile in the form of the battery unit. The battery unit can be attached to an isolated frame so that it can be easily arranged on, detached from, or exchangeed in the automobile. Generally, a main contactor, which belongs to a controlling system utilizing strong current, is arranged between the battery unit and motor. The battery unit is preferably controlled as a whole in its temperature by the temperature-controlling device according to air-cooling system or water-cooling system. The term of temperature-controlling is used to mean any operation for cooling, warming, or combination of cooling and warming, which is carried out for keeping the battery unit at an appropriate temperature for the work of the secondary battery.

The temperature controlling can be done by circulating a fluid at an appropriate temperature around the battery unit or providing a fluid at an appropriate temperature to the battery unit. The fluid can be air or water. The air cooling is preferably employed because the air cooling can easily keep the atmosphere between the battery modules at a constant temperature, and it allows easy rearrangement of the battery units. An appropriate temperature-controlling system for air-cooling is described in Japanese Patent Provisional Publication No. H7-47842. For instance, the battery unit is arranged under the floor panel so as to be exposed to an open air which is uniformly supplied by branched ducts. When the warming is required in a chilled atmosphere, the open air is warmed in advance of being supplied to the battery unit. The air-cooling system can be employed in combination with the water-cooling system.

The electric automobile of the invention is equipped with at least one auxiliary electric power source in addition to the main electric power of the lithium ion secondary battery. The auxiliary electric power source should be not the lithium ion secondary battery, that is, a secondary battery of non-lithium ion type.

Representative examples of the secondary batteries of non-lithium ion type are those of aqueous electrolytic solution type which are set forth below:

1) lead/acid battery 2) nickel/iron battery or nickel/zinc battery 3) nickel/hydrogen battery 4) metal/air battery or high capacitance capacitor 5) sodium/sulfur battery or sodium/metal chloride battery The auxiliary battery is employed for compensating the unfavorable characteristics of the lithium ion secondary battery such as lowering of high current-discharging ability at a low temperature condition, so as to improve the practical performance and safety of the electric automobile. The lead/acid battery and nickel-hydrogen (Ni-MH) battery are preferred, from the viewpoints of high performance and safety. The lead/acid battery comprises a lead electrode and an aqueous sulfuric acid solution and gives a 2 V output at mono cell. Therefore, a plurality of lead/acid batteries are connected in series to form a unit which produces a large electric current. The engine-starter cell which is already mounted onto the gasoline-engine automobile as well as the sealed lead battery for electric automobile are also preferred. The nickel/hydrogen (Ni-MH) battery causes charge and discharge by moving hydrogen ion between the nickel positive electrode and the hydrogen-absorbing metal alloy. The hydrogen-absorbing metal alloy can be a rare earth element alloy (represented by the formula of $AB_5$) or a Lerbes phase alloy (represented by the formula of $AB_2$). The electrolyte generally is an aqueous alkaline solution. The mono cells (output voltage: 1.2 V) are connected in series to give a combined cell giving an electric current at a high voltage.

The hybrid use of the lithium ion secondary battery and the secondary battery of non-lithium ion type in combination is effective for providing the motor starting power under chilling conditions, warming the lithium ion secondary battery, keeping the lithium ion secondary battery from over-heating in the case that the automobile is driven on an ascending road or under accelerated conditions, providing an electric power to an air-conditioning apparatus such as a cooling apparatus or a worming apparatus, and/or providing auxiliary electric power to prolong the driving distance.

A fuel cell and a solar battery also can be employed as the auxiliary battery.

The fuel cell produces an electric power more efficiently as compared with a gasoline engine-driven automobile and is advantageous from the viewpoint of air pollution. The lithium ion secondary battery utilizing the manganese oxide positive active material is advantageously employed in combination with the fuel cell to establish the superiority of the electric automobile employing the lithium ion second battery. Therefore, the combination of the lithium ion secondary battery of the invention with the fuel cell is preferred.

Examples of the fuel cells are set forth below.

1) Alkali fuel cell (AFC)

2) Phosphoric acid fuel cell (PAFC)

3) Solid electrolyte fuel cell (SOFC)

4) Polymer solid electrolyte fuel cell (PEFC)

5) Molten carbonate fuel cell (MCFC)

Details of the fuel cells are described in "Electrochemistry and Industrial Physical Chemistry", vol. 61, No.11, pp. 1258 (1993). SOFC, PEFC and PAFC are preferably employed in combination with the lithium ion secondary battery of the invention from the viewpoints of safety and performance. Specifically, PEFC and SOFC utilizing hydrogen fuel which is encased into a cylinder or absorbed by a hydrogen-absorbing alloy are advantageous, because they can be provided in a small-sized and light-weight form.

The hybrid use of the lithium ion secondary battery and the fuel cell in combination is also effective for warming the lithium ion secondary battery, keeping the lithium ion secondary battery from over-heating in the case that the automobile is driven on an ascending road or under accelerated conditions, providing an electric power to an air-conditioning apparatus such as a cooling apparatus or a worming apparatus, and/or providing auxiliary electric power to prolong the driving distance.

The solar battery is also employed as the auxiliary electric power source, in place of the above-mentioned batteries which produce an electric power by chemical reaction.

A representative solar battery is a photoelectric conversion cell of solid contact type such as an amorphous silicone type which is already employed for a solar car. The solar battery can be placed on surfaces to expose to sunlight such as roof, bonnet, and trunk room. The solar battery can be employed in combination with the lithium ion secondary battery primarily because it can serve as electric power generator for generating electric power for charging the lithium ion secondary battery. The solar battery can also be utilized for warming the lithium ion secondary battery, keeping the lithium ion secondary battery from over-heating in the case that the automobile is driven on an ascending road or under accelerated conditions, providing an electric power to an air-conditioning apparatus such as a cooling apparatus or a worming apparatus, and/or providing auxiliary electric power to prolong the driving distance.

Accordingly, the lithium ion secondary battery of the invention can be most preferably employed in combination with the fuel cell or the solar battery.

The attached FIGURE schematically illustrates the electric system of the electric automobile or the electric power drive means and related systems. The numeral 1 indicates a combination of AC/DC conversion rectifier and electric charger; 2 indicates a contactor for attaching or detaching the main electric power source; 3 indicates the lithium ion secondary battery serving as main electric power source; 4 indicates a temperature-controlling system and an electric heater in combination; and 5 indicates a temperature sensor for monitoring the temperature of lithium ion secondary battery. The driving system comprises a main contact 6, and a combination of a power head and motor 7. To the driving force transmittance system is attached a regenerative braking device 8. The numeral 9 indicates a solar battery or a fuel cell which serves as an auxiliary electric power source. The numeral 11 indicates a non-lithium ion secondary battery which serves as an auxiliary electric power source. The electric power supplied from the solar battery or fuel cell 9 or generated by the regenerative battery 8 may be supplied to the non-lithium ion secondary battery 11 or a controlling device 12 for output system after being processed by an input controlling unit 10 for switching, rectifying, or voltage controlling. The numeral 13 indicates a load in the low voltage system other than the temperature controlling system.

In the design of the automobile body, the battery frame in which the lithium ion secondary battery (main electric power source) is encased is arranged under the floor panel and fixed to the panel under the condition that the battery frame can be detached from or attached to the panel. A duct for air-cooling is arranged on and/or in the frame so that the duct can serve as a temperature cooling element by supplying to the battery unit an air cooled by a radiator. Alternatively, a pipe for circulating a cooled water and attaining the water cooling can be provided. The cooling can be controlled under the temperature controlling device which is responsive to variation of the temperature detected by the sensor. The battery unit can be otherwise warmed by a heater which is arranged on the bottom of the frame.

The present invention is further described in the following non-limitative examples.

EXAMPLE 1

The following two sets of rectangular lithium ion secondary batteries (LSB-1 and LSB-2, 40 mm×60 mm×375 mm for each) were prepared.

(1) LSB-1

Positive electrode: $Li_{1.02}Mn_{1.9}Co_{0.03}O_4$ (crystalline active material of spinel crystal structure), a graphite electroconductive material and a binder were mixed and coated on an aluminum collector sheet.

Negative electrode: metal alloy ($Li_2MgSn$, $Li_2MgGe_{0.5}Sn_{0.5}$, $LiAl_{0.9}Mg_{0.1}$, or $Li_{3.8}Si$), a graphite electroconductive material and a binder were mixed and coated on a copper collector sheet.

Electrolyte: polymer electrolyte composed of a mixture of $LiBF_4$ and polyethylene oxide (PEO)

(2) LSB-2

Positive electrode: $Li_{1.02}Mn_{1.9}Fe_{0.03}O_4$ (crystalline active material of spinel crystal structure), a graphite electroconductive material and a binder were mixed and coated on an aluminum collector sheet.

Negative electrode: a carbonaceous material produced by graphiting mesophase microsphare to give a spherical graphite and rendering a portion of its surface amorphous, a graphite electroconductive material and a binder were mixed and coated on a copper collector sheet.

Electrolyte: polymer electrolyte composed of a mixture of $LiBF_4$ and polyethylene oxide (PEO)

(3) Evaluation

Each of the resulting batteries was charged to 4.2 V (rated voltage) and then discharged to 2.8 V (rated voltage) by means of a charging and discharging controlling circuit. An average discharging voltage was 3.7 V for LSB1 and 3.5 V for LSB2.

Six LSB1 or LSB2 batteries were connected and a protective circuit (safety means for inhibiting over-charge or over-discharge) was attached to the connected batteries, to give a battery module. The discharge voltages of the batteries were 22 V for LSB1 and 20 V for LSB2. The electric capacitances were 90 Ah for LSB1 and 75 Ah for LSB2. The weight was 20 kg, and the size varied to 350 mm×75 mm×450 mm, for each module.

15 Battery modules were prepared from each battery, connected in series, and combined in the form of arrangement of 5×3 (longitudinal direction×width direction) which was a main electric power source for automobile motor and occupied a space of 1750 mm×75 mm×1350 mm.

Thus produced main electric power sources had a total weight of 320 kg, and gave a voltage of 330 V (LSB1) and a voltage of 310 (LSB2) and the capacitances of 32 KWh (LSB1) and 24 kWh (LSB2).

The main power source was installed into a battery frame designed for automobile use. Onto the bottom of the battery frame was arranged an electric heater (500 W) so that the battery units could be warmed under controlled conditions. To the frame was attached a sensor (thermistor) for monitoring the temperature of the battery unit. The frame was detachable with respect to the electric system and mechanical system. The manufactured system is similar to that illustrated in the attached FIGURE.

The driving performance of the electric automobile equipped with the above-mentioned electric power driving system was evaluated by the following model tests.

Four DC motors (maximum output: 100 kW, input: 330 V) attached in parallel to the main electric power source were driven repeated in the cycle consisting of the following procedure: start—acceleration—constant rotation (10 min. at 2,000 r.p.m.)—decelerating by regenerative braking—stop. The outer diameter of the wheel to be directly connected to the motor was 45 cm.

The motor-driving test was performed after fully charging each of the battery units up to 370 V, and the low speed acceleration was performed at 30 times per sec by controlling the rotation rate in the acceleration. The temperature of the battery unit was controlled in a thermostat room and by applying a blowing air to the unit.

The driving distance after the full charge was made was determined. The results are set forth in Table 2.

TABLE 2

| Battery | Temperature on battery | Regenerative braking | Driving Distance |
|---|---|---|---|
| LSB1 | 5° C. | done | 150 km |
|  | 35° C. | done | 210 km |
|  | 35° C. | none | 170 km |
|  | 80° C. | done | 190 km |
| LSB2 | 5° C. | done | 120 km |
|  | 35° C. | done | 170 km |
|  | 35° C. | none | 150 km |
|  | 80° C. | done | 160 km |

The results set forth in Table 2 indicate that the electric automobile equipped with the lithium ion secondary battery using the manganese oxide positive electrode active material and the regenerative braking system are superior in the driving distance at one charging procedure, particularly when the temperature on the battery is well controlled.

EXAMPLE 2

The following two sets of rectangular lithium ion secondary batteries (LSB-3 and LSB-4, 40 mm×60 mm×375 mm for each) were prepared.

(1) LSB-3

Positive electrode: $Li_{1.02}Mn_{1.9}Co_{0.03}O_4$ (crystalline active material of spinel crystal structure), a graphite electroconductive material and a binder were mixed and coated on an aluminum collector sheet.

Negative electrode: metal alloy ($SnB_{0.5}P_{0.5}O_3$ or $Sn_{1.0}Cs_{0.1}Al_{0.1}B_{0.5}P_{0.5}$) a graphite electroconductive material and a binder were mixed and coated on a copper collector sheet.

Electrolyte: polymer electrolyte composed of a mixture of $LiBF_4$ and polyethylene oxide (PEO)

(2) LSB-4

Positive electrode: $Li_{1.02}Mn_{1.9}Fe_{0.03}O_4$ (crystalline active material of spinel crystal structure), a graphite electroconductive material and a binder were mixed and coated on an aluminum collector sheet.

Negative electrode: metal alloy ($Sn_{1.0}Ge_{0.05}Cs_{0.1}Al_{0.1}B_{0.5}P_{0.5}O_x$), a graphite electroconductive material and a binder were mixed and coated on a copper collector sheet, a graphite electroconductive material and a binder were mixed and coated on a copper collector sheet.

Electrolyte: polymer electrolyte composed of a mixture of $LiBF_4$ and polyethylene oxide (PEO)

(3) Evaluation

Each of the resulting batteries was charged to 4.2 V (rated voltage) and then discharged to 2.8 V (rated voltage) by means of a charging and discharging controlling circuit. An average discharging voltage was 3.5 V for both of LSB3 and LSB4.

Six LSB3 or LSB4 batteries were connected and a protective circuit (safety means for inhibiting over-charge or over-discharge) was attached to the connected batteries, to give a battery module. The discharge voltages of the batteries were 20.5 V for both of LSB3 and LSB4. The electric capacitances were 90–95 Ah for both of LSB3 and LSB4. The weight was 20 kg, and the size varied to 350 mm×75 mm×450 mm, for each module.

15 Battery modules were prepared from each battery, connected in series, and combined in the form of arrangement of 5×3 (longitudinal direction×width direction) which was a main electric power source for automobile motor and occupied a space of 1750 mm×75 mm×1350 mm.

Thus produced main electric power sources had a total weight of 320 kg, and gave a voltage of 310 V (LSB3 and LSB4) and the capacitance of 30 KWh (LSB3 and LSB4).

The main power source was installed into a battery frame designed for automobile use. Onto the bottom of the battery frame was arranged an electric heater (500 W) so that the battery units could be warmed under controlled conditions. To the frame was attached a sensor (thermistor) for monitoring the temperature of the battery unit. The frame was detachable with respect to the electric system and mechanical system. The manufactured system is similar to that illustrated in the attached FIGURE.

The driving performance of the electric automobile equipped with the above-mentioned electric power driving system was evaluated by the same model tests as those described in Example 1.

The driving distance after the full charge was made was determined. The results are set forth in Table 3.

TABLE 3

| Battery | Temperature on battery | Regenerative braking | Driving Distance |
|---|---|---|---|
| LSB3 | 5° C. | done | 150 km |
|  | 35° C. | done | 195 km |
|  | 35° C. | none | 170 km |
|  | 80° C. | done | 180 km |
| LSB4 | 5° C. | done | 150 km |
|  | 35° C. | done | 200 km |
|  | 35° C. | none | 175 km |
|  | 80° C. | done | 190 km |

The results set forth in Table 3 indicate that the electric automobile equipped with the lithium ion secondary battery using a negative electrode active material of the complex metal oxide which accepts intercalation of lithium ion and the regenerative braking system are superior in the driving distance at one charging procedure, particularly when the temperature on the battery is well controlled.

What is claimed is:

1. An electric power drive means which comprises a main electric power drive source comprising a lithium ion secondary battery which contains a positive electrode active material comprising lithium manganese oxide of spinel crystal structure, an auxiliary electric power source, a temperature-controlling means, and a regenerative braking means;

wherein the lithium manganese oxide has the following formula:

$$Li_xMn_{2-a}M_{a/c}O_{4+b}$$

wherein M is a cation of a metal other than Li and Mn, and x, a, c and b are numbers satisfying the conditions of $0.1 < x \leq 1.2$, $0 < a < 2$, $1 \leq c \leq 3$, and $0 \leq b < 0.3$, respectively.

2. The electric power drive means of claim 1, wherein the lithium ion secondary battery contains a negative electrode active material comprising a metal alloy which accepts intercalation of a lithium ion.

3. The electric power drive means of claim 1, wherein the lithium ion secondary battery contains a solid electrolyte comprising an ion conductive polymer or an ion conductive inorganic material.

4. The electric power drive means of claim 1, wherein the auxiliary electric power source is selected from the group consisting of a lead-acid battery, a nickel-hydrogen battery, a sodium cell, a fuel cell, and a solar battery.

5. An electric automobile which is equipped with a main electric power drive source comprising a lithium ion secondary battery which contains a positive electrode active material comprising lithium manganese oxide of spinel crystal structure, an auxiliary electric power source, a temperature-controlling means, and a regenerative braking means;

wherein the lithium manganese oxide has the following formula:

$$Li_xMn_{2-a}M_{a/c}O_{4+b}$$

wherein M is a cation of a metal other than Li and Mn, and x, a, c and b are numbers satisfying the conditions of $0.1 < x \leq 1.2$, $0 < a < 2$, $1 \leq c \leq 3$, and $0 \leq b < 0.3$, respectively.

6. The electric automobile of claim 5, wherein the lithium ion secondary battery contains a negative electrode active material comprising a metal alloy or an oxide of a combination of tin (II) and one or more other elements which accepts intercalation of a lithium ion.

7. The electric automobile of claim 5, wherein the lithium ion secondary battery contains a solid electrolyte comprising an ion conductive polymer or an ion conductive inorganic material.

8. The electric automobile of claim 5, wherein the auxiliary electric power source is selected from the group consisting of a lead-acid battery, a nickel-hydrogen battery, a sodium cell, a fuel cell, and a solar battery.

9. The electric automobile of claim 5, wherein the lithium ion secondary battery comprises one or more of a plurality of battery units connected in series which is encased in the temperature-controlling means.

* * * * *